No. 878,820. PATENTED FEB. 11, 1908.
A. MURDOCH.
FISH TRAP.
APPLICATION FILED OCT. 4, 1906.
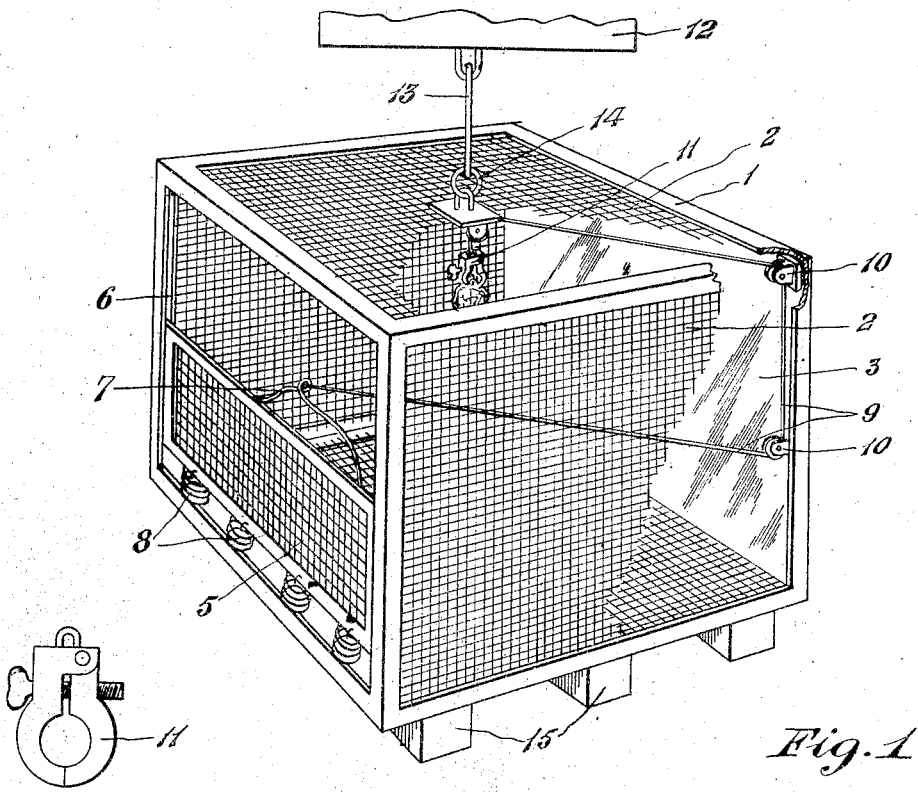
Fig. 1.
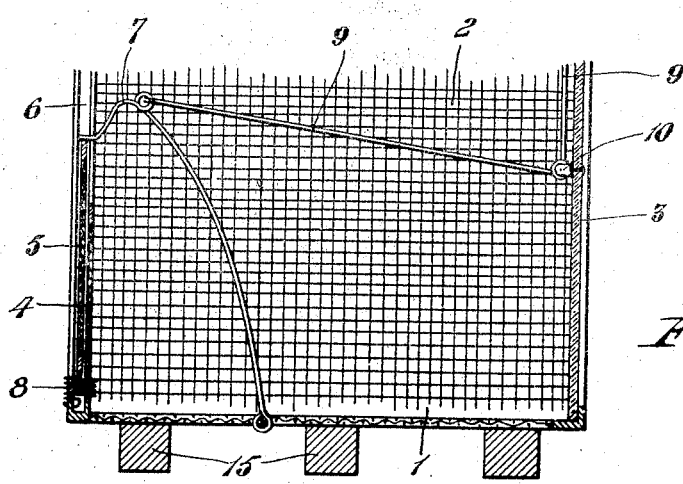
Fig. 3.
Fig. 2.
Witnesses  
Stuart R. W. Allen  
William G. Armstrong
Inventor  
Andrew Murdoch  
By Fred Falvinteyh, Atty

UNITED STATES PATENT OFFICE.

ANDREW MURDOCH, OF MONTREAL, QUEBEC, CANADA.

FISH-TRAP.

No. 878,820.  Specification of Letters Patent.  Patented Feb. 11, 1908.

Application filed October 4, 1906. Serial No. 337,351.

*To all whom it may concern:*

Be it known that I, ANDREW MURDOCH, of the city of Montreal, in the Province of Quebec and Dominion of Canada, have invented certain new and useful Improvements in Fish-Traps, of which the following is a full, clear, and exact description.

My invention relates to improvements in fish traps, and its object is to provide a light and inexpensive trap into which the fish will be decoyed by their own reflection.

To accomplish these objects I provide a cage having its top, sides and bottom of wire mesh. The front is of wire mesh but divided transversely, the lower half being fixed and the upper half slidably mounted. The upper front half is normally held down by a catch, but when released rises under the impulse of a plurality of helical springs and closes the trap. The back of the cage is formed of a mirror.

In the drawings which illustrate my invention:—Figure 1 is a perspective view of the trap set. Fig. 2 is a vertical section of the trap and shows the arrangement of the door. Fig. 3 is a plan view of the vise for holding the bait.

In the above defined figures, 1 designates the framework of the cage or trap, and 2 the wire mesh forming the top, sides and bottom. A mirror 3 forms the back. The lower half of the front is closed by a fixed frame 4 over which wire netting is stretched. The upper half of the front is adapted to be closed by a sliding door 5 also of wire netting. The door 5 slides in grooves 6 formed in the framework and is normally held down by a latch 7 but when released rises under the impulse of a plurality of helical springs 8 and closes the trap. To release the door 5, a cord 9 is attached at one end to the latch 7 and passes through a system of pulleys 10, the other end being attached to a small vise 11 which hangs in the center of the trap and holds the bait. The trap is suspended in the water from a float 12 by means of a cord 13 which passes through a ring 14 in the top of the trap. The trap is held steady in the water by a plurality of sinkers 15 fixed to the bottom thereof.

The operation of the device consists in submerging the baited and set trap to any desired depth. The fish passing in front of the trap see their reflections in the mirror and imagining another fish about to get the bait make a dash for it. The jerk given the bait by the fish's rush releases the latch by means of the cord, thus allowing the door 5 to rise and imprison the fish.

The advantages of this device are numerous and will be obvious to those skilled in fishing.

My invention will be particularly useful to naturalists, or others desiring to secure specimens, as the fish are in no way injured.

Having thus described my invention so that the same may be readily understood by those skilled in the art to which it appertains, what I claim and desire to secure by Letters Patent, is:—

1. In a fish trap, a meshed cage, a mirror at the back thereof, an opening in the upper half of the front, a meshed sliding door adapted to close said opening, springs actuating said door, and a pivoted latch within the cage for maintaining said door in open position.

2. In a fish trap, a meshed cage having the upper half of its front open, a mirror opposite said opening, a slidable spring actuated door adapted to close said opening, a latch normally maintaining said door in open position, and a cord and pulley system actuated by the fish for withdrawing said latch and releasing said door.

3. In a fish trap, a meshed cage, a mirror at the back thereof, a sliding door opposite said mirror, springs adapted to close said door, a pivoted latch within the cage normally maintaining said door open, a cord and pulley system operated by the fish for withdrawing said latch, sinkers on the bottom of said cage, and a float attached to the top of said cage.

4. In a fish trap, a meshed cage, a mirror at the back thereof, a sliding door opposite said mirror, springs adapted to close said door, a latch pivoted to the bottom of said cage for normally maintaining said door open, a plurality of pulleys within said cage, a cord attached at one end to the latch and passing over said pulleys, a bait clamp attached to the other end of said cord, a plurality of sinkers fixed to the bottom of the cage, and a float connected to the top of said cage.

In witness whereof I have hereunto set my hand in the presence of two witnesses.

ANDREW MURDOCH.

Witnesses:
  C. W. TAYLOR,
  C. R. MCKENZIE.